United States Patent [19]

Miller et al.

[11] Patent Number: 4,725,030
[45] Date of Patent: Feb. 16, 1988

[54] REMOVABLE BRACKET FOR ATTACHMENT TO RAIL

[75] Inventors: David H. Miller, Walnut Creek; Robert E. Cox, Berkeley; Crisanto R. Enano, San Pablo; Thomas G. Moulton, San Francisco, all of Calif.

[73] Assignee: Hospital Systems, Inc., Oakland, Calif.

[21] Appl. No.: 946,926

[22] Filed: Dec. 29, 1986

[51] Int. Cl.⁴ ............................................. F16B 7/00
[52] U.S. Cl. ................................. 248/297.2; 248/229; 248/231.2; 24/606; 403/297
[58] Field of Search .................... 248/540, 541, 219.3, 248/228, 229, 231.2, 231.5, 231.6, 297.2; 403/254, 255, 297; 24/606, 607, 613; 269/97, 99, 100, 76

[56] References Cited

U.S. PATENT DOCUMENTS

| | | | |
|---|---|---|---|
| 1,052,107 | 12/1966 | Traub | 403/297 |
| 2,494,159 | 1/1950 | Bernstein | 24/606 |
| 2,735,519 | 2/1956 | Frischmann | 24/606 |
| 3,463,430 | 8/1969 | Rubin | 248/229 |
| 3,749,345 | 7/1973 | Luder | 248/125 |
| 3,811,785 | 5/1974 | Hagglund | 403/297 |
| 3,955,722 | 5/1976 | Bard | 248/125 |
| 3,966,342 | 6/1976 | Moriya | 403/297 |
| 4,049,230 | 9/1977 | Minniear | 248/231.2 |
| 4,485,597 | 12/1984 | Worrallo | 403/255 |
| 4,549,832 | 10/1985 | Sterl | 403/297 |
| 4,574,552 | 3/1986 | Korth | 403/297 |

FOREIGN PATENT DOCUMENTS 2436904  5/1980  France .............................. 403/297

*Primary Examiner*—J. Franklin Foss
*Assistant Examiner*—Robert A. Olson
*Attorney, Agent, or Firm*—Julian Caplan

[57] ABSTRACT

A bracket to support instruments, lamps and other equipment is detachably connected to the lipped channel used in hospital wall and cart constructions. The bracket has a hollow housing having a hole at one end to receive a rod on which the instrument is mounted with a set screw to hold the rod in place. The opposite end of the housing has a first projecting lug to fit inside one lip of the channel. A dog member fits inside the housing and has a projecting second lug to fit inside the other lip of the channel. An adjustment screw fits inside the housing and threadedly engages the dog to move the second lug toward and away from the first lug. When the lugs are close together, they may be inserted between the channel lips at any point along the length of the channel. By turning the adjustment screw, the second lug may be drawn away from the first lug to lock against the channel lips, securing the bracket in position.

4 Claims, 4 Drawing Figures

REMOVABLE BRACKET FOR ATTACHMENT TO RAIL

BACKGROUND OF THE INVENTION

1. Field of the Invention

This invention relates to a new and improved bracket for various instruments, preferably for use in hospitals, which may be detachably adjustably connected to lipped channels which are a structural part of hospital room walls or equipment carts of otherwise conventional types. The bracket is characterized in that it has a permanent and an adjustable lug. When the adjustable lug is positioned close to the fixed lug, the two may be inserted between the lips of the channel in any position along the length of the channel and then moved longitudinally to the desired location. Thereupon, the adjustable lug is drawn away from the fixed lug until it engages the opposite channel lip, whereby the bracket is locked in position.

2. Description of Related Art

Heretofore, brackets for instruments have been inserted between the lips of channels either from one end of the channel or through windows cut in the lips of the channel. A present invention is more convenient in its use because it does not require the formation of windows in the channel, nor the insertion of the bracket from an end of the channel. Thus, attachment is more rapid and requires less attention by the user.

Further, it is frequently necessary to install a second bracket where a first bracket is already in place. In many such instances, because the bracket already in place is interposed between the channel window and the desired location of the second bracket, it is necessary to remove the first bracket and the equipment supported thereby before the second bracket can be inserted. Because the bracket of the present invention can be installed at any position along the length of the channel, it is not necessary to remove a bracket already in place in the same channel.

SUMMARY OF THE INVENTION

The bracket has a hollow housing formed at one end with a hole to receive a rod on which a hospital instrument or piece of hospital equipment is supported. On the opposite end of the housing is afixed lug having an outward directed finger which fits within and behind one lip of the channel. A dog is positioned within the housing having an outward projecting lug similar to the fixed lug. An adjustment screw on the exterior of the housing has its stem extending within the housing and in threaded engagement with the dog. By turning the adjustment knob, the second lug may be brought toward or away from the permanent lug. When the lugs are positioned in close proximity, they fit within the space between the lips of the channel. By turning the adjustment knob, the dog and its movable lug may be drawn away from the fixed lug until the movable lug engages the opposite lip of the channel, thereby locking the bracket in place Other objects of the present invention will become apparent upon reading the following specification and referring to the accompanying drawing in which similar characters of reference represent corresponding parts in each of the several views.

DESCRIPTION OF PREFERRED EMBODIMENT

Figure 1:
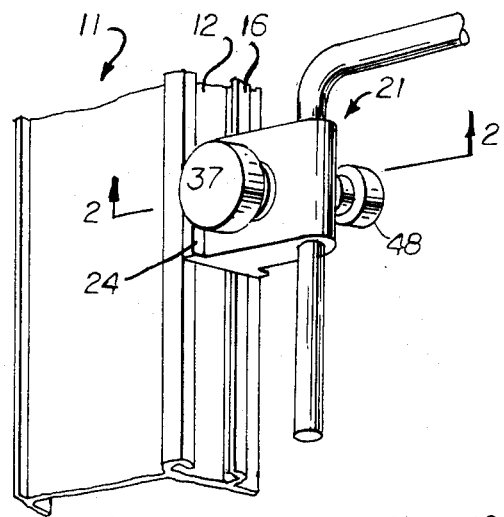
FIG. 1 is a fragmentary perspective view of a bracket in accordance with the present invention attached to a wall structural member having a channel formed therein.

Structural member 11 may be part of a hospital room wall or a cart of the type positioned near the patient's bed. The member 11 is formed with an elongated channel 12 which has a base 13, sides 14 extending parallel to each other and away from the base 13 and each having an inturned lip 16. There is a space 17 between the inner edges of lips 16.

The bracket 21 of the present invention is hollow and has an outer end 22, parallel sides 23 and outward turned feet 24 which engage the outsides of the lips 16 when the bracket is installed. An opening 26, here shown as of oval shape is formed in one end of the bracket 21. Projecting outward beyond the feet 24 is a first or fixed lug 27 having an outward turned finger 28. With the foot 24 against the lip 16, the finger 28 fits inside the lip 26 and may lock thereagainst.

Positioned within the hollow of the bracket 21 is a dog 31 having at its outer end a second or movable lug 32, also having a finger 33 which extends in the direction opposite the finger 28. When the lugs are together (as shown in FIG. 3)) the distance between the outer edges of the lugs 28 and 33 is such that the lugs may be inserted in the space 17.

Figure 2:
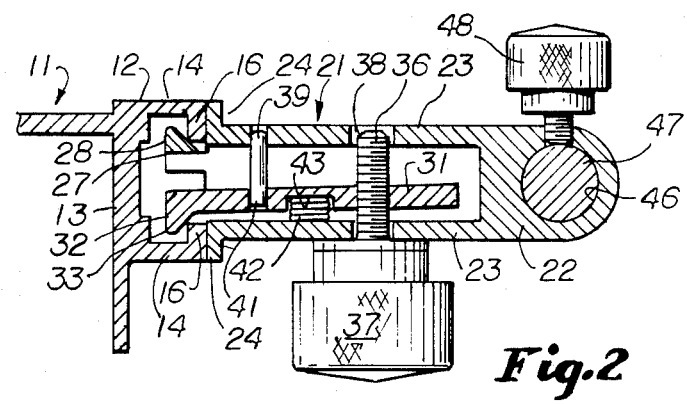
FIG. 2 is an enlarged sectional view taken substantially along the line 2—2 of FIG. 1.

Screw 36 fits through an oversized hole in one side 23 of bracket 21 and is in threaded engagement with a hole in dog 31. This screw 36 also may project through an oversized hole 38 in the opposite side of bracket 21, as best shown in FIGS. 2 and 3. A guide pin 39 is fixed to one side 23 and fits through a hole 41 in dog 31, thereby preventing the dog from moving out of alignment. Spring 42 fits into a seat 43 formed in dog 31 and is interposed between the dog 31 and one of the sides 53, biasing dog 31 from the position of FIG. 2 toward the position of FIG. 3.

Figure 3:
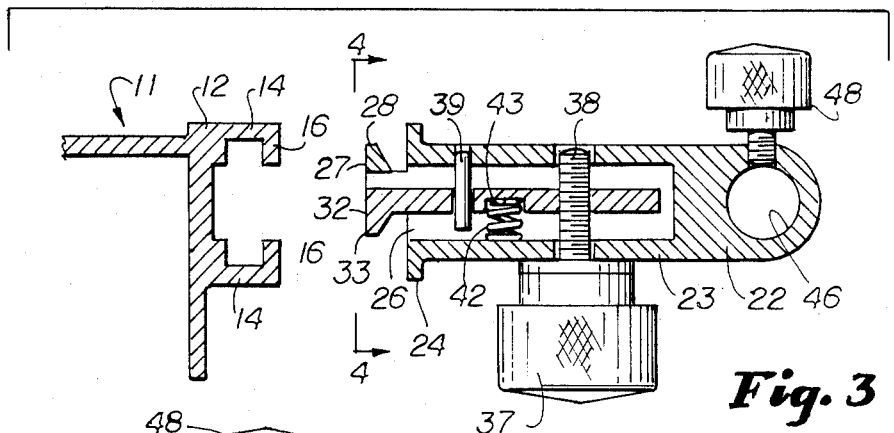
FIG. 3 is an exploded sectional view similar to FIG. 2 showing how the dog of the bracket may be moved toward the fixed lug to permit insertion and removal of the bracket from the channel.
Figure 4:
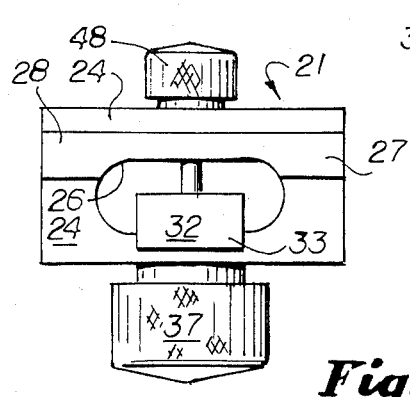
FIG. 4 is an end view of the bracket viewed from the left of FIG. 3.

Thus, after the lugs 27 and 32 when they are in the position of FIG. 3 have been inserted through the space 17, the user turns the knob 37, causing the dog to move from the position of FIG. 3 to the position of FIG. 2 against the force of spring 42. This brings the fingers 28 and 33 apart so that they lock against the insides of the lips 16, thereby fixing the bracket 21 in place. It will be understood, however, that after the fingers 28, 33 have been inserted in the opening 17, nevertheless the bracket 21 may be moved longitudinally of the channel 12 to any desired position. By reversing the procedure, the bracket 21 may be withdrawn at any time.

Bracket 21 is useful to support various pieces of hospital equipment. Thus, a hole 46 is formed in the end 22 to receive a rod 47 on which the equipment is supported. Set screw 48 threaded into the end 22 engages the rod 47 and secures the same against longitudinal movement.

What is claimed is:

1. In combination, a clamp bracket and a channel, said channel having a base, sides extending from said base and inturned first and second lips on the outer ends of said sides with a space between the inner ends of said lips, said lips having parallel inside and outside surfaces and perpendicular ends intersecting said inside surfaces in first and second corners, said bracket comprising a hollow housing having an outer end and an inner end, said inner end being formed with an opening, a first lug extending outward from said inner end and a first finger having an outward-slanted first bearing surface positioned to fit inside said first of said lips and to engage a first corner at the intersection of the end and inside surface of said first lip, a dog inside said housing and extending out through said opening, said dog having a second lug and a second finger having an outward-slanted second bearing surface positioned to fit inside said second of said lips and to engage a second corner at the intersection of the end and inside surface of said second lip, and means on said housing engaging said dog to move said second lug toward and away from said first lug while maintaining said first lug and said dog substantially parallel to each other, said second lug when moved toward said first lug spacing said fingers close enough together to fit through said space within said channel, said bracket being movable longitudinally of said channel, said second lug when moved away from said first lug clamping said slanted first and second bearing surfaces against said corners of said lips to secure said bracket longitudinally of said channel.

2. A bracket according to claim 1 in which said outer end of said housing is formed with an aperture for a rod and which further comprises a set screw in said housing fitting into said aperture and turnable to secure said rod in position relative to said bracket, said rod being axially and rotatably movable relative to said bracket prior to turning said set screw to secure said rod.

3. A bracket according to claim 1 which further comprises resilient means within said housing biasing said dog toward said first lug, a guide pin extending into the hollow of said housing, said dog being formed with a hole to receive said guide pin, said guide pin aligning said dog for movement toward and away from said first lug.

4. A bracket according to claim 1 which further comprises feet on said inner end of said housing positioned to engage the outsides of the lips of said channel, when said second lug is moved away from said first lug to secure said bracket.

* * * * *